US008396061B2

(12) United States Patent
Saklecha et al.

(10) Patent No.: US 8,396,061 B2
(45) Date of Patent: Mar. 12, 2013

(54) APPARATUS AND SYSTEM FOR COUPLING AND DECOUPLING INITIATOR DEVICES TO A NETWORK WITHOUT DISRUPTING THE NETWORK

(75) Inventors: Bhavi Saklecha, Fremont, CA (US); Kean P. Hurley, Aptos, CA (US); Alfonso Y. Ip, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 2153 days.

(21) Appl. No.: 11/202,223

(22) Filed: Aug. 12, 2005

(65) Prior Publication Data
US 2006/0034284 A1 Feb. 16, 2006

Related U.S. Application Data

(60) Provisional application No. 60/600,835, filed on Aug. 12, 2004.

(51) Int. Cl.
*H04L 12/28* (2006.01)
(52) U.S. Cl. .......................... 370/392; 710/316; 379/242
(58) Field of Classification Search .................. 370/392, 370/395.31, 453; 709/220, 223, 229, 250, 709/224, 213; 710/15; 713/201, 200; 714/7
See application file for complete search history.

(56) References Cited

U.S. PATENT DOCUMENTS

| 6,014,383 | A  | * | 1/2000  | McCarty ........................ 370/453 |
| 6,347,334 | B1 | * | 2/2002  | Fredericks et al. ............ 709/220 |
| 6,725,394 | B1 | * | 4/2004  | Bolt ................................ 714/7 |
| 7,203,730 | B1 | * | 4/2007  | Meyer et al. ................... 709/213 |
| 2002/0103913 | A1 | * | 8/2002  | Tawil et al. ..................... 709/229 |
| 2003/0043816 | A1 | * | 3/2003  | Mitchem et al. ......... 370/395.31 |
| 2004/0015611 | A1 | * | 1/2004  | Kim ................................ 709/250 |
| 2004/0049564 | A1 | * | 3/2004  | Ng et al. ........................ 709/223 |
| 2004/0148376 | A1 | * | 7/2004  | Rangan et al. ................ 709/223 |
| 2004/0221047 | A1 | * | 11/2004 | Grover .......................... 709/229 |
| 2005/0076113 | A1 | * | 4/2005  | Klotz et al. ................... 709/224 |
| 2005/0108444 | A1 | * | 5/2005  | Flauaus et al. .................. 710/15 |
| 2005/0114702 | A1 | * | 5/2005  | Klein et al. ..................... 713/201 |
| 2005/0198523 | A1 | * | 9/2005  | Shanbhag et al. ............ 713/200 |
| 2006/0092932 | A1 |   | 5/2006  | Ghosh et al. |

OTHER PUBLICATIONS

"Cisco MDS 9000 Family Fabric Manger User's Guide", Cisco Systems, Inc., San Jose, CA, Release 1.2(1a), Sep. 2003, 149 pgs.

* cited by examiner

*Primary Examiner* — Robert Wilson
*Assistant Examiner* — Lionel Preval
(74) *Attorney, Agent, or Firm* — Sterne, Kessler, Goldstein & Fox PLLC

(57) ABSTRACT

The present invention enables the coupling and decoupling of multiple processing devices to a network without disrupting the network. In an embodiment, the invention provides a switch having a network port and several initiator ports each configured for coupling to a processing device. The switch is configured to route data from the network port to the initiator ports and from the initiator ports to the network port. A management agent facilitates operation of the switch by processing port initializations, replying to device registration requests, and processing predetermined unsolicited discovery commands. During operation, the management agent enables configuration changes caused, for example, by the coupling and/or decoupling of processing device to initiator ports. Each processing device coupled to one of the initiator ports operates without knowledge of the management agent, as if coupled directly to the network.

20 Claims, 9 Drawing Sheets

APPARATUS AND SYSTEM FOR COUPLING AND DECOUPLING INITIATOR DEVICES TO A NETWORK WITHOUT DISRUPTING THE NETWORK

CROSS REFERENCE TO RELATED APPLICATION

This application claims the benefit of U.S. Provisional Patent Application No. 60/600,835, filed Aug. 12, 2004, which is incorporated herein by reference in its entirety.

FIELD OF THE INVENTION

The present invention generally relates to a network of devices. More particularly, it relates to an apparatus and system for coupling and decoupling initiator devices to a network without disrupting the network.

BACKGROUND OF THE INVENTION

The data storage market includes a number of vendors and products. Unfortunately, integrating various products from different vendors is difficult, and it requires a substantial investment due to a lack of interoperability standards.

In one instance, in order to increase system performance and lower costs, the manufacturers of blade servers and other storage devices are considering integrating a Fibre Channel fabric switch into their devices. However, a blade server with an integrated fabric switch is likely to have difficulties communicating to an external network because of incompatibilities and proprietary features. The conventional wisdom is that such devices are connected using a Fibre Channel E-Port or B-Port topology, thereby allowing fabric related information to be communicated. But, this causes many currently available Fibre Channel fabric switches to be reconfigured to a mode in which proprietary features are turned off and functions are disabled, resulting in a disruption of the network. It is also likely to create network management problems.

What is needed are new ways for integrating products from different venders to an existing network that overcome the deficiencies noted above.

BRIEF SUMMARY OF THE INVENTION

The present invention enables the coupling and decoupling of multiple processing devices to a network without disrupting the network. In an embodiment, the invention provides a switch having a network port and several initiator ports each configured for coupling to a processing device. The switch is configured to route data from the network port to the initiator ports and from the initiator ports to the network port. A management agent facilitates operation of the switch by processing port initializations, replying to device registration requests, and processing predetermined unsolicited discovery commands. During operation, the management agent enables configuration changes caused, for example, by the coupling and/or decoupling of processing device to initiator ports. Each processing device coupled to one of the initiator ports operates without knowledge of the management agent, as if coupled directly to the network.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

The present invention enables the coupling and decoupling of multiple processing devices to a network without disrupting the network. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
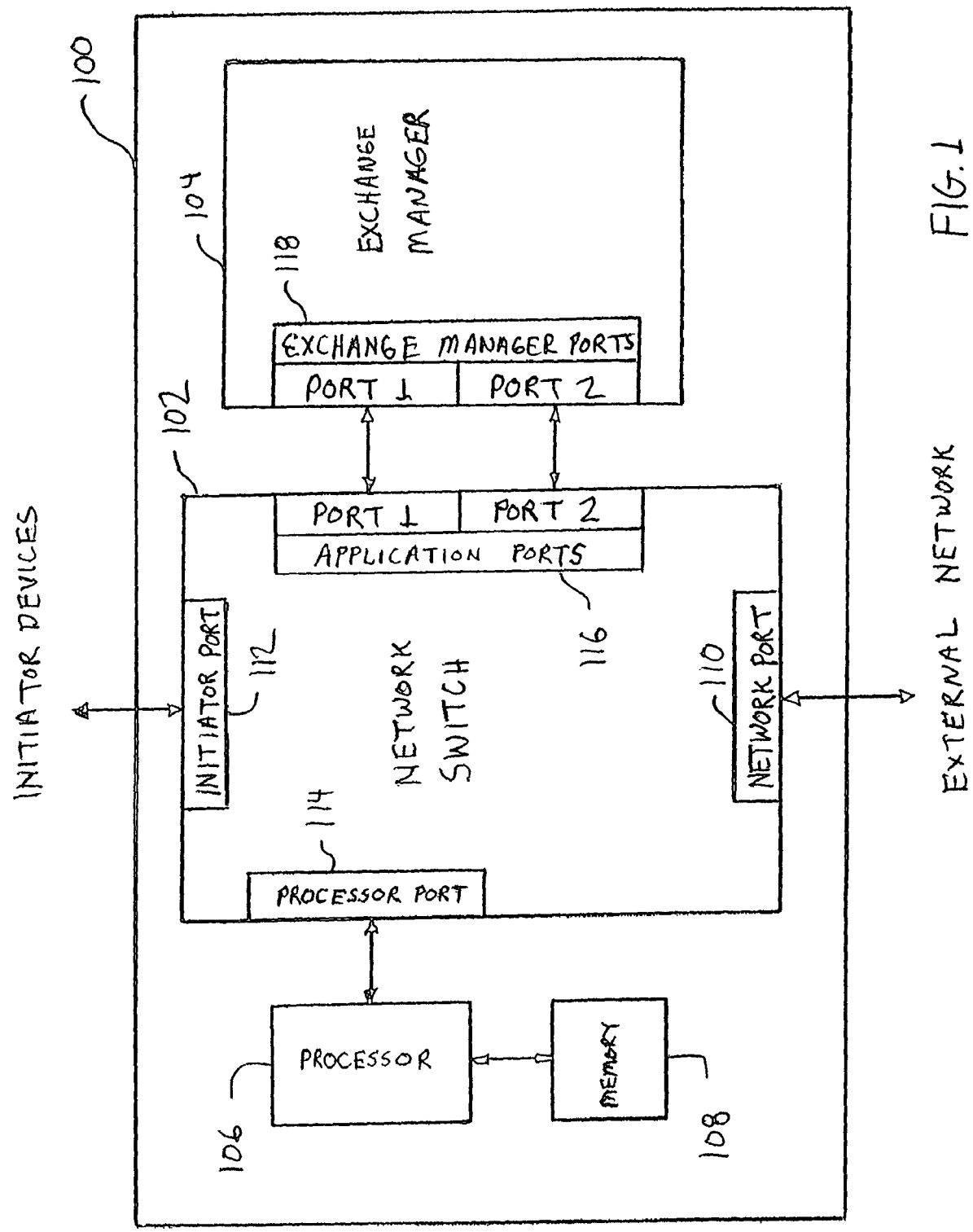
FIG. 1 is a schematic diagram of an example apparatus for coupling and decoupling multiple processing devices to a network according to an embodiment of the invention.

FIG. 1 illustrates an example apparatus 100 for coupling and decoupling multiple processing or initiator devices to a network according to an embodiment of the invention. Apparatus 100 includes a network switch 102, an exchange manager 104, a processor 106, and memory 108.

Network switch 102 includes a network port 110, an initiator port 112, a processor port 114, and application ports 116. Network port 110 is configured for coupling to an external network. Initiator port 112 is configured for coupling to multiple processing or initiator devices such as, for example, server blades. Processor port 114 couples network switch 102 to processor 106. Application ports 116 couple network switch 102 to exchange manager ports 118 of exchange manager 104.

In an embodiment, apparatus 100 operates in a non-loop mode referred to herein as N_PORT mode. In this mode, apparatus 100 connects to an external network such as, for example, a Fibre Channel fabric via network port 110 such that network port 110 operates as an N_PORT as defined in the Fibre Channel standards.

It is a feature of apparatus 100 that selected portions can be formed using commercially available hardware. For example, in an embodiment, network switch 102 is a commercially available network switch such as, for example, Broadcom Corporation's BCM8440 Fibre Channel fabric switch, available from Broadcom Corporation, Irvine Calif. Processor 106 can be formed using a MIPS processing core available from MIPS, Inc., Mountain View Calif. Exchange manager 104 can be formed using a variety of commercially available field programmable gate arrays.

Figure 2:
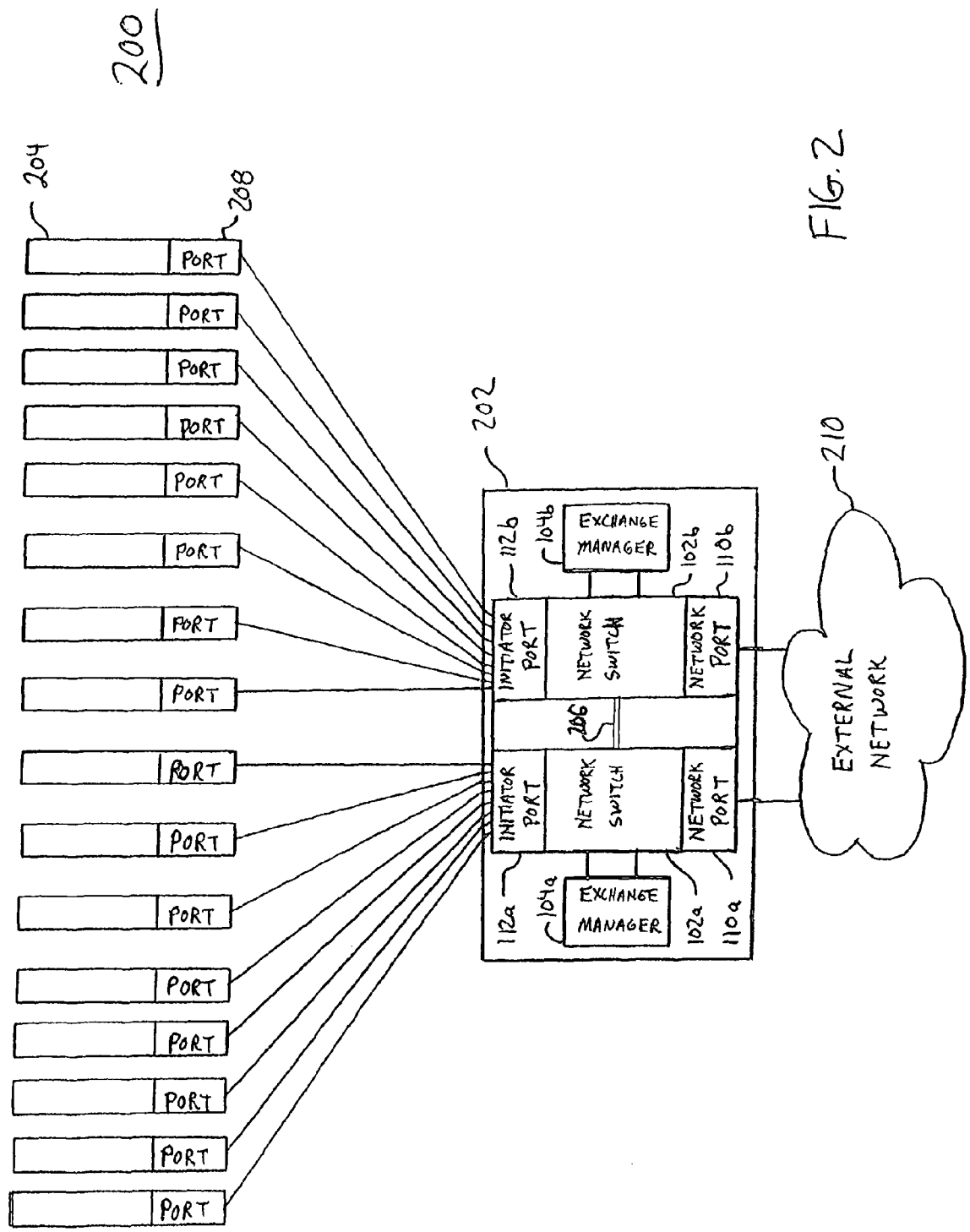
FIG. 2 is a schematic diagram of an example system according to an embodiment of the invention.

FIG. 2 illustrates an example system 200 according to an embodiment of the invention. System 200 includes an aggregator circuit 202 and a plurality of initiator devices 204. Aggregator circuit 202 couples initiator devices 204 to an external network 210.

As shown in FIG. 2, aggregator circuit 202 includes two network switches 102a and 102b. Network switches 102a and 102b each have a network port 110 and an initiator port 112. In an embodiment, each network switch 102 operates in N_PORT mode and each network port 110 operates as an N_PORT as defined in the Fibre Channel standards. Each network switch 102 is coupled to an exchange manager 104. In an embodiment, network switches 102a and 102b are coupled to one another by an inter-switch communications link 206.

Initiator devices 204 each have a port 208. Port 208 is used to couple an initiator device 204 to an initiator port 112 of a network switch 102. In an embodiment, initiator devices 204 are Fibre Channel Protocol-Small Computer System Interface (FCP-SCSI) initiator devices, and initiator port 112 includes a plurality of FC-FS2 point-to-point ports for connecting to FCP-SCSI initiator devices.

Figure 3:
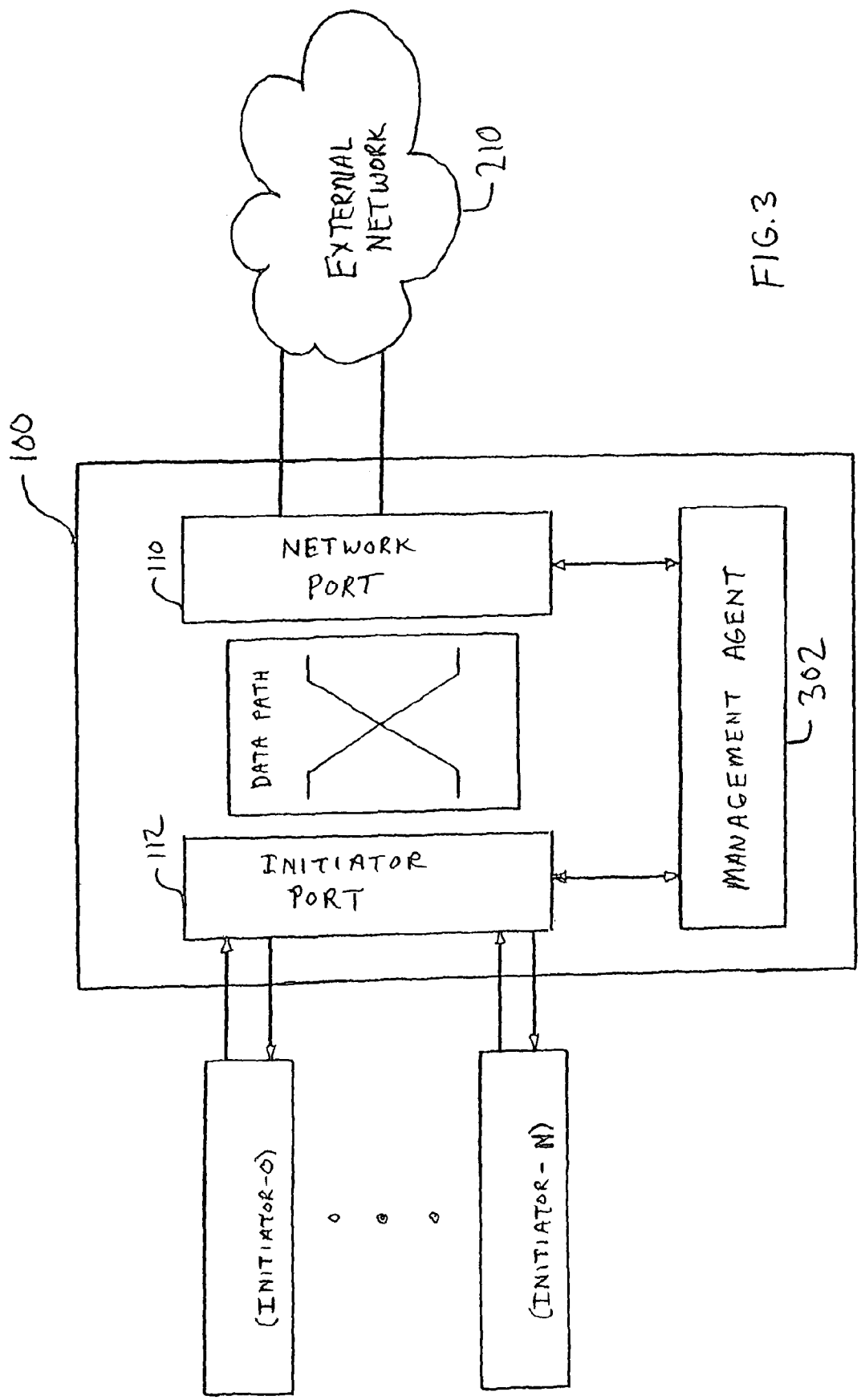
FIG. 3 is a schematic diagram that illustrates routing of management frame traffic according to an embodiment of the invention.

As illustrated by FIG. 3, all management frame traffic (e.g., port initializations, logins, and extended link services) in an apparatus, such as apparatus 100, is forwarded to an internal management agent 302 for processing. In an embodiment, internal management agent 302 is a software based management agent that is responsible for processing port events and management frame traffic for both network port 110 and initiator port 112. More details regarding management agent 302 are provided below.

Point-to-point login (PLOGI) frames from devices connected to initiator port 112 are routed to processor 106 via processor port 114 (see FIG. 1). Because there could be open exchanges or active exchanges between a target device and other initiator devices coupled to initiator port 112, aggregator circuit 202 (or apparatus 100) selectively removes only those exchanges that were originated by the initiator device that is sending the PLOGI frame. This is handled by management agent 302 and/or exchange manager 104.

A PLOGI frame is an ELS frame sent by an initiator device when the port comes up or if the initiator device needs to re-login to a target device. The effect of a PLOGI frame on a target device is to clear all exchanges that are from that initiator device. Sending a PLOGI frame to a target device after address translation affects all the exchanges at the target device. Thus, PLOGI frames are filtered and changed to a different protocol so that only exchanges created by the N-ph initiator device issuing the PLOGI frame are cleared at the target device.

In embodiments, aggregator circuit 202 (or apparatus 100) filters a PLOGI frame sent by an initiator device coupled to initiator port 112 using network switch 102 (e.g., a BCM8440) to capture it and forwarded it to processor 106. Depending on the condition that caused the PLOGI frame, management agent 302 will issue an abort sequence frame (ABTS) such as, for example, ABTS_ALL or a ABTS_DID.

When management agent 302 receives the PLOGI frame while initiator port 112 is in an active state, it will issue an ABTS_DID command to exchange manager 104. The ABTS_DID command includes the S_ID of the N-ph PORT. Exchange manager 104 generates ABTS frames for all the open exchanges of the specified N-ph PORT. Exchange manager 104 changes the internal exchange state to ABTS_SENT. Exchange manager 104 removes the exchange from its table when it receives the response LS_ACC frame for each ABTS that was sent. Processor 106 is interrupted when all ABTS frames are sent and acknowledged. At this point, management agent 302 sends the PLOGI LS_ACC link service reply frame back to the initiator device.

As noted above, portions of the present invention can be implemented using commercially available hardware. When network switch 102 is implemented, for example, using Broadcom's BCM8440 chip, all the D_ID routing and ELS filtering can be in the BCM8440 chip. Link and ELS management for initiator ports 112 and network ports 110 can be performed by firmware and/or software running, for example, Linux code on a MIPS Processor. If required for a particular embodiment, exchange management and S_ID/D_ID translation can be performed using exchange manager 104.

In embodiments, management agent 302 is a firmware component responsible for processing port events and management frame traffic for initiator port 112 and network port 110. Management agent 302 operates such that network port 110 appears to external network devices as if it were an N_PORT FCP_SCSI initiator device. Management agent 302 also operates in a manner that gives each initiator device connected to initiator port 112 the idea that it is directly connected to an external network (e.g., to a fabric switch).

Figure 4:
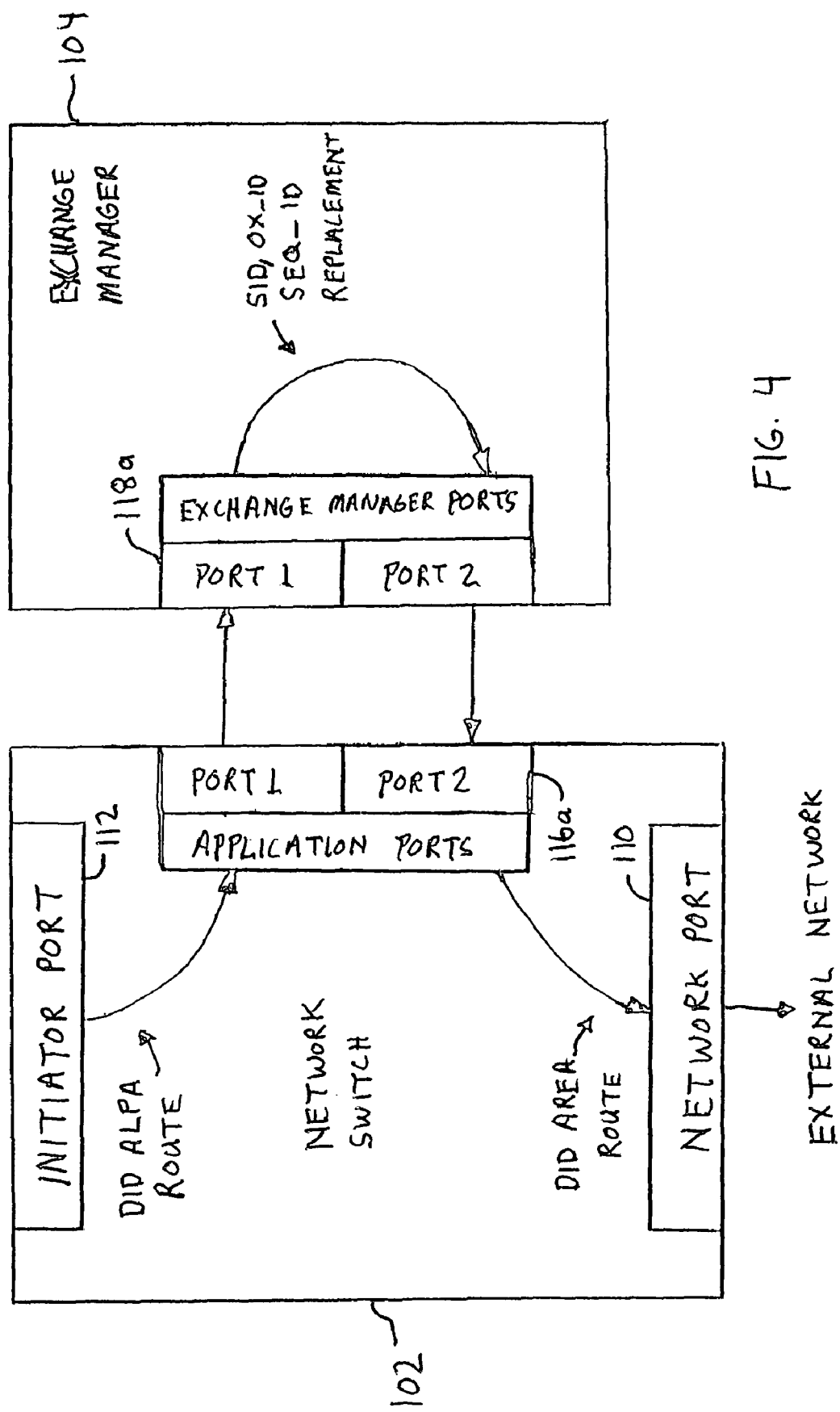
FIG. 4 is a schematic diagram that illustrates an initiator port to network port data path according to an embodiment of the present invention.

FIG. 4 is an illustration of initiator port 112 to network port 110 mapping, as implemented in an embodiment of the present invention. In FIG. 4, a translated IO (exchange) is originated by a particular initiator devise 204 (see FIG. 2). The particular initiator device sends, for example, a Fibre Channel Protocol command (FCP_CMND) frame whose destination is a DID that needs to be routed through exchange manager 104. Exchange manager 104 receives the frame on exchange manager port 118a and performs the necessary address replacements to the FCP_CMND frame.

Exchange manager 104 processes the command frame and creates an initiator port 112 to network port 110 mapping for the exchange. This is achieved, for example, by creating an entry in an internal IO table 600 (see FIG. 6) corresponding to the exchange. Exchange manager 104 then replaces the SID of the initiator with the SID of the address of network port 110.

As illustrated by FIG. 4, exchange manager 104 creates a new FCP_CMND frame and forwards the new FCP_CMND frame to network switch 102 at application port 116a. Subsequent frames for the exchange are received by exchange manager 104 and handled as specified by its corresponding IO table entry.

Figure 5:
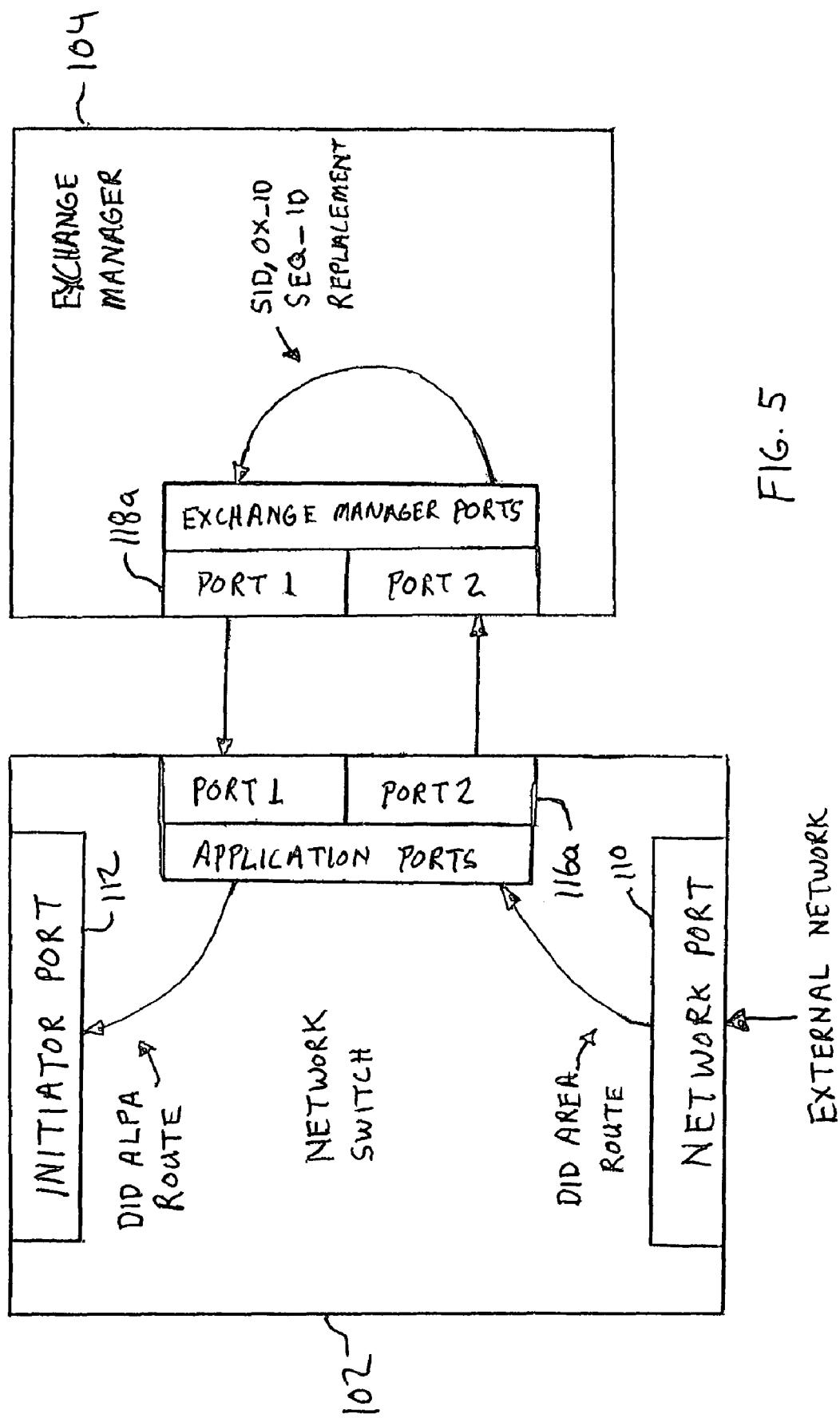
FIG. 5 is a schematic diagram that illustrates a network port to initiator port data path according to an embodiment of the present invention.

As illustrated in FIG. 5, a corresponding response frame from a target communicating with the initiator device 204 via an external network will be received at network port 110 of network switch 102. The response frame is routed through exchange manager 104. The frame is looked up in an IO table entry, residing within exchange manager 104, which is related to the exchange, and the necessary address replacements are made to the response frame. Exchange manager 104 replaces the DID of the frame with the DID of the initiator device. The frame is then sent to network switch 102 on exchange manager port 118a. Network switch 102 routes the frame to the particular initiator port 112 corresponding to the initiator device 204.

In order to appropriately translate exchanges and Fibre Channel frame sequences, exchange manager 104 desirably tracks, for example, Exchange Begin, Exchange End, Sequence Begin, and Sequence End FCP commands. For exchange translation for an N_PORT device, the SID is desirably transposed so that SEQ_ID reuse is maintained as defined, for example, in Fibre Channel standard FC-FS-2.

Figure 6:
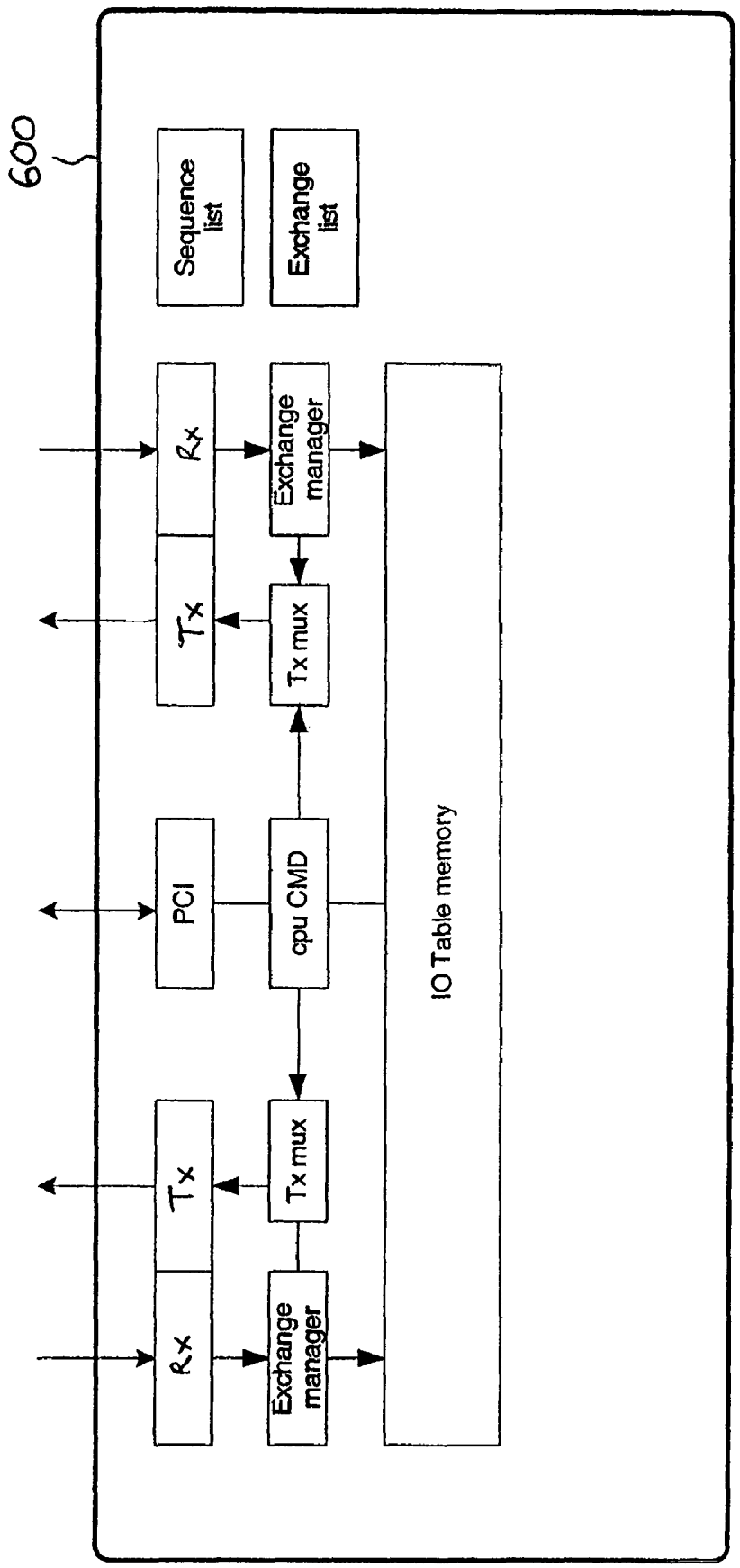
FIG. 6 is a schematic diagram that illustrates an exemplary IO table according to an embodiment of the present invention.

FIG. 6 is a schematic diagram illustrating an exemplary IO table 600. When exchange manager 104 receives the first exchange from an initiator device 204, it identifies the exchange and creates a new entry in IO table 600. This provides exchange manager 104 a starting point for tracking subsequent frames of the exchange. The SID, OX_ID, and SEQ_ID of the first exchange frame is replaced with the SID of network port 110, a new OX_ID generated by exchange manager 104, and a new SEQ_ID generated by exchange manager 104.

When a responder sends the first response frame having the new OX_ID, exchange manager 104 performs a look up in IO table 600 using the new OX_ID as an index. Exchange manager 104 then retrieves the original SID, OX_ID and SEQ_ID and replaces those fields. Additionally, exchange manager 104 saves the responder exchange identifier (RX_ID) in IO table 600 and replaces the RX_ID of the response frame with a new RX_ID. To simplify this process, in an embodiment, exchange manager 104 uses the same value for the OX_ID. For subsequent frames from the originator, IO table 600 is indexed by the RX_ID of the frame.

By simplifying the process as noted above, simpler memory schemes can be used to index into IO table 600 entries. An exemplary technique for indexing IO table 600 might include the first exchange frame creating a new entry using the new OX_ID generated by exchange manager 104 as the index. For frames from the responder, the new OX_ID is used as the index, and any subsequent initiator frames can use the RX_ID.

Figure 7:
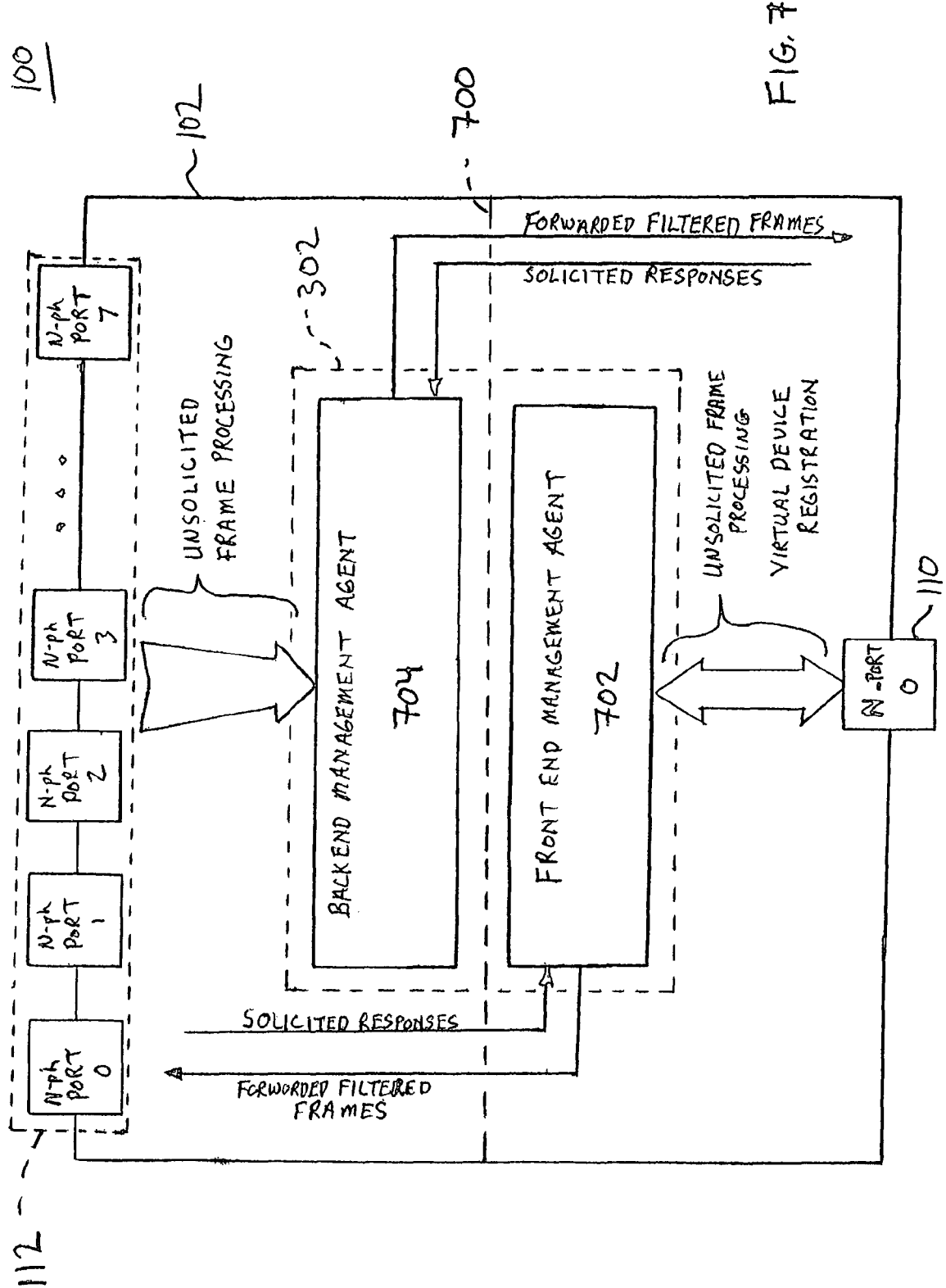
FIG. 7 is a schematic diagram that illustrates operation of a management agent and routing of frame traffic according to an embodiment of the present invention.

FIG. 7 illustrates how one can think of apparatus 100 as having a dividing line 700 at the midsection of network switch 102, which separates network port 110 from initiator port 112.

As shown in FIG. 7, management frame processing is different for the different port types. Accordingly, management agent 302 can be thought of as including a front-end management agent 702 and a back-end management agent 704. Front-end management agent 702 performs operations relating to specific tasks associated with network port 110. Back-end management agent 704 performs operations relating to specific tasks associated with initiator port 112. These specific tasks include handling unsolicited management request frames from network port 110 and initiator port 112. Depending on processing logic, these frames may be filtered and forwarded, or the frames may be processed directly by management agent 302 and a management response returned.

In embodiments, management agent 302 is responsible for one or more of the following tasks:

1. Forwarding non-disruptive (query/get) oriented management frames from initiator port 112 (i.e., the N-ph_PORTs) to network port 110;
2. Re-mapping back-end N-ph_PORT NPID and WWPN parameter field values to fixed NPID and WWPN values;
3. Internally processing and replying to registration oriented management frames issued from initiator devices coupled to initiator port 112;
4. Performing device registration for initiator devices coupled to network port 110;
5. Hiding back-end initiator port connection oriented events (port up/port down) from the external network (e.g., the back-end ports should be considered I/O processing engines, and the addition or removal of these back-end ports should be isolated from the front-end port and the external network);
6. Processing connection oriented management frames (PLOGI/RCSN) to cleanup hardware exchange re-mapping table(s) (e.g., FCP-SCSI-2 and Fibre Channel_PLDA describe exchange "clearing effects" related to ELS and SCSI task management frames, and exchange entries may need to be programmed to issue ABTS protocol or internal exchange cleanup); and
7. Storing (locally cache) connection oriented requests (PLOGI/PDISC) to target devices. (PLOGI frames have implicit exchange and sequence clearing effects at a target, and it is undesirable to forward these frames. Only the first PLOGI frame from a back-end N-ph_PORT is forwarded to the external network. Subsequent PLOGI requests are returned from ELS_ACC parameter(s) saved locally in local connection cache.)

Front-end management agent 702 is responsible for management frame processing related to network port 110. For example, front-end management agent 702 processes port initialization and initiates device registration for network port 110. In embodiments, the scope of frame processing is the full required protocol coverage of ELS and Name Server frames mentioned in Fibre Channel-FLA 2.7.

In embodiments, front-end management agent 702 assign a unique static WWPN/WWNN for each network port 110. The WWPN remains fixed and static irregardless of the actual initiator devices connected to the back-end N-ph_PORTs. Front-end management agent 702 also is responsible for processing all unsolicited ELS and Fabric Service frames sent from a fabric.

In embodiments, front-end management agent 702 is responsible for processing one or more of the following:

1. Network port initialization;
2. Device registration with a network controller (e.g., FLOGI);
3. Device registration with Name Server (NS set operations);
4. Rx RCSN forwarding and fan-out to back-end N-ph_PORTs (exchange cleanup handling);
5. Rx generic ELS processing;
6. Proxy agent probing;
7. Rx unsolicited FCP-SCSI discovery command(s);
8. SCSI inquiries; and
9. Vital product data page information.

Front-end management agent 702 performs port initialization for each front-end port, for example, in system 202. In an embodiment, the network port initializes using Fibre Channel-FS point-to-point protocol in N_PORT mode.

The back-end ports (N-ph PORTs) associated with the front-end ports are affected by the port-up and port-down events occurring on the front-end network ports. When a front-end network port 110 goes down, it forces each associated N-ph_PORT into an offline state, for example, by sending NOS continuously to all associated N-ph PORTs. It also sends a CLR_EXCHANGE command to exchange manager 104 to clear IO table 600.

When a network port 110 returns to proper operation, it completes name server and fabric logic services, and it allows associated N-ph_PORTs to come on line. Back-end management agent 704 assigns port IDs to the N-ph_PORTs and sends accept responses to N-ph_PORT registration requests. Initiators devices on the N-ph PORTs then send PLOGIs. Back-end management agent 704 processes the PLOGIs and forwards the first PLOGI of each target. Subsequent PLOGIs for the same target are suppressed. PLOGI ELS_ACC from targets are captured and processed by front-end management agent 702.

Front-end management agent 702 sources fabric logic (FLOGI) requests for each front-end N_PORT. A fixed WWPN/WWNN is used for these devices. The public address domain and areas components (e.g., DDAA[XX]) returned from the fabric assigned to the front-end port in the FLOGI accept frame is used for all associated back-end ports. Back-end management agent 704 uses this internally recorded address identifier (DDAA) for back-end N-ph_PORT FLOGI response processing. Registration for state change notification(s) is performed for each front-end N_PORT device using SRC protocol.

Front-end management agent 702 also sources NS registration frames for each front-end N_PORT. This includes registration of Fibre Channel-4 types RFT_ID, device port ID RPN_ID (fixed WWPN value), device port name RNN_ID, device node name: RSNN_NN (fixed WWNN assigned value), and the symbolic port name RSPN_ID. Registration is performed for each N_PORT exposed to the external network.

Front-end management agent 702 is responsible for receiving and processing unsolicited RSCN request frames from a fabric controller for each front-end N_PORT. Front-end management agent 702 replicates registered state change notification (RSCN) events and forwards the appropriate data to associated back-end N-ph_PORTs. RSCN "port down" events are processed by the management agent to preclude any undesired flushing of entries in the PLOGI connection cache table for network port 110.

Front-end management agent 702 receives and processes unsolicited ELS frames for FCP-SCSI initiator devices, for example, according to the Fibre Channel-FLA 2.7 standard. The frames/requests are directly processed and returned by front-end management agent 702. The responses return information defining a FCP-SCSI initiator, and no interaction with back-end management agent is required. In embodiments, front-end management agent 702 supports the following ELS frames as ELS Responder: ADISC, FAN, PLOGO, PDISC, PLOGI, PRLI, PRLO, RNC, RRQ, RSCN. In selected embodiments, the following ELS frames also are supported: ABTX, RES, RLS, RSI, RSS, SCN, SCR, TPRLO.

Many fabric switch devices have proxy discovery agents that probe edge devices in order to help populate the Name Server database. These devices can source ELS requests to network port 110. In embodiments, front-end management agent 702 satisfies requests for information from these devices about network port 110.

In an embodiment, front-end management agent 702 receives and processes unsolicited FCP-SCSI discovery commands. These requests also are processed and returned by front-end management agent 702, returning information defining a FCP-SCSI initiator, without interaction with back-end management agent 704. The following FCP-SCSI FCP commands are supported: Test Unit Ready, Inquiry-Standard, and Inquiry-Vital Product Data. The Vital Product Data page returns the WWPN/WWNN of network port 110.

Back-end management agent 704 is responsible for management frame processing related to the N-ph_PORTs (initiator port 112) connected to back-end FCP-initiator devices. Back-end management agent 704 processes port initializations and replies to device registration requests for the N-ph_PORTs. The internal behavior of back-end management agent 704 allows initiator devices to operate as if they were directly connected to the external network (e.g., Fabric Switch) coupled to network port 110. In N_PORT mode, each initiator device coupled to an N-ph_PORT can operate as if it were the only device coupled to network port 110. This is accomplished by specialized forwarding and filtering of ELS and Fabric Services frames, as illustrated in FIG. 7. Fabric controller and name server registration is isolated and hidden from the external network/connected fabric.

Back-end management agent 704 maintains a PLOGI connection table cache. PLOGI's are forwarded to FCP-target devices only when needed. General WWPN re-mapping to a fixed WWPN (related to network port 110) occurs for ELS and Fabric Service frames sourced by back-end ports.

In embodiments, back-end management agent 704 is responsible for processing/performing one or more of the following:

1. Port Initialization (N-ph_PORTs);
2. Unsolicited ELS/Fabric Service frames required for FCP-SCSI initiators by Fibre Channel-FLA 2.7;
3. Fabric Control FLOGI frame requests;
4. Name Server registrations;
5. Name Server queries;
6. PLOGI frame handling and internal table management (e.g., exchange cleanup handling); and
7. Receiving Fibre Channel-SCSI task management requests from N-ph_PORTs (exchange cleanup handling).

In embodiments, back-end management agent 704 performs port initialization for each back-end N-ph PORT. The ports initialize using Fibre Channel-FS point-to-point protocol. The back-end N-ph PORTs are only allowed to become "active" ports after their associated front-end network port 110 has been initialized and achieved an active state. At this point, an N-ph PORT sends name server registration and fabric login requests to back-end management agent 704. Back-end management agent 704 assigns a port ID to the N-ph_PORT and sends accept responses to registration requests. An initiator device on the N-ph PORT next sends a PLOGI request to target device(s). Back-end management agent 704 processes the PLOGI and forwards it if it is the first PLOGI for a particular target. If network port 110 has already sent a PLOGI for the target, the PLOGI is suppressed. If the PLOGI is forwarded, back-end management agent 704 captures and processes the PLOGI ELS_ACC frame from the target and forwards it to the N-ph_PORT. If the PLOGI is suppressed, back-end management agent 704 generates an PLOGI ELS_ACC frame using the saved response previously returned from the target.

In embodiments of the invention, all ELS and Fabric Service unsolicited requests sourced from back-end ports are received and processed by back-end management agent 704. In general, both the unsolicited requests and solicited responses are NPID/WWPN/WWNN filtered as follows:

1. The unsolicited requests from N-ph_PORTs (which are forwarded to the fabric) have the N-ph_PORT initiators true NPID/WWPN/WWNN remapped to the associated network port 110 device NPID/WWPN/WWNN; and
2. The solicited response frames returned from the fabric have the network port 110 NPID/WWPN/WWNN remapped to the N-ph_PORT initiators actual NPID/WWPN/WWNN.

Specialized handling of specific ELS/Fabric Service unsolicited requested are described in more detail below.

Back-end management agent 704 is responsible for receiving and responding to all FLOGI frames generated by N-ph_PORT devices. These requests are directly processed and returned by back-end management agent 704.

Internal checking/processing is performed on the FLOGI service parameters requested by each N-ph_PORT initiator device. The requested service parameters must be supported by the FLOGI service parameters negotiated by the associated frond-end network port device, and they are returned based on the negotiated front-end port service parameters.

The NPID assigned to the each back-end port is based on the domain and area (DDAA--) address components assigned to the associated front-end network port. The ALPA/device component of the address (----XX) maps to fixed ALPA addresses assigned to each back-end N-ph_PORT.

Returned link level negotiated values such as BBC, are processed based on the local link resources of the N-ph_PORT.

Back-end management agent 704 also processes Fabric Service Name Server Registrations sourced from back-end N-ph_PORTs. These registration requests are terminated and acknowledge directly by back-end management agent 704. They are not forwarded to the Fabric as it is an objective of the present invention to hide or to virtualize the actual back-end initiators. All unsolicited Name Service registrations requests (0xX2XX type match) are acknowledge without the requirement for establishing and maintaining a local database.

As illustrated in FIG. 7, in embodiments, back-end management agent 704 forwards Fabric Service Name Server Query/Get requests (0xX1XX type match) sourced from back-end N-ph_PORTs. These registration requests are forward through the associated network port 110. The frames are filtered, and references to NPID or WWPN/WWNN are replaced as described above. Frame filtering is performed on unsolicited requests forwarded to the external network/fabric such that N-ph_PORT ID/name data are changed to the appropriate network port 110 ID/name data. Frame filtering is performed on the solicited responses returned from the external network/fabric such that network port 110 ID/name data are changed to the appropriate N-ph_PORT ID/name data. These query operation are non-disruptive to the external network/fabric, and hence the forwarded protocol has no or minimal impact on external network/Fabric state or I/O data paths.

In embodiments, back-end management agent 704 performs processing of unsolicited PLOGI/PLOGO requests from back-end ports. As noted herein, PLOGI and PLOGO requests have global clearing effects on all open exchanges with the destination device. Thus, it is undesirable to forward these frames for each back-end N-ph_PORT making a connection request because they would cause I/O aborts for all other active N-ph_PORTs. Only the first PLOGI from a back-end N-ph_PORT is forwarded to the external network/Fabric. All subsequence PLOGI requests are terminated and directly responded to with cached ELS_ACC parameter saved locally in a local connection cache.

In embodiments, a PLOGI Connection Table data structure is, for the most part, maintained by back-end management agent 704. In one embodiment, the table specifies an entry state (e.g., used, pending response, connected), the NPID of a connected target, a bitmap of connected N-ph_PORTs, a count of connected N-ph_PORTs, and the full ELS response of the first PLOGI ELS_ACC. An entry in the table is created when an ELS_ACC is received for the first PLOGI to the target device. Subsequent PLOGIs to the same target cause an update to the N-ph_PORT connection bitmap and count. Back-end management agent 704 uses the saved PLOGI ELS_ACC to locally accept each subsequent PLOGI to the same target.

In embodiments, when an N-ph_PORT logs out of a target, the PLOGO is captured by back-end management agent 704. The N-ph_PORT connection bitmap and count is updated. When the last N-ph PORT logs out of a target, a PLOGO is then issued to the target. The entry in the connection table can be removed when the PLOGO response is received.

In embodiments, back-end management agent 704 receives, processes, and forwards SCSI_FCP frames that contain reset oriented task management operations. These frames have implicit exchange clearing effects for the destination target (see, e.g., FCP-SCSI-2 Clearing Effects Tables). Back-end management agent 704 performs the appropriate exchange clearing operation in conjunction with exchange manager 104. In the event of a SCSI Target Reset or a Clear Task Set, all tasks for all SCSI initiator ports with open tasks are cleared. In the event of an Abort Task Set, all tasks are cleared, but only for the port that sourced the command.

In a Fibre Channel N_PORT aggregation application, one front end network port 110 (an N_PORT) connected to a fabric aggregates traffic from backend initiator ports 112. Each network port 110 is allowed to have up to 64 K of open exchanges in the fibre channel protocol. Network port 110 would then allocate its exchange IDs (on the fabric connection) among the backend initiator ports 112. As an example, the exchange ID can be a 16 bit entity. To distribute the 64 K exchange IDs among (m) number of backend initiator ports 112, n bits, where $m<=2^n$, is needed to identify the backend initiator ports 112. The (n) most significant bits of the exchange ID are used to identify a particular initiator port 112; and the remaining (16-n) bits represent a consecutive range of exchange IDs.

For example, for 8 backend initiator ports 112, each back-end port gets 8 K of the front end exchange IDs. It is noted here, however, that the invention is not limited to any particular number of ports.

Fibre Channel standard FC-FS-2 specifies that an N port could have up to 64 K of exchanges. When a front end network port 110 is used to aggregate traffic for multiple backend initiator ports 112, it is necessary to limit the number of exchanges that each backend initiator port 112 can open.

The ability to confine the number of exchanges on front end network port 110 to 64 K enables front end network port 110 to aggregate traffic from multiple back end initiator ports 112; and to be compliant with established Fibre Channel Standards, which is an advantage over conventional means.

The approach can be modified and made applicable to allocate exchange IDs unevenly to favor selected backend initiator ports 112 if the application warrants the uneven distribution.

Figure 8:
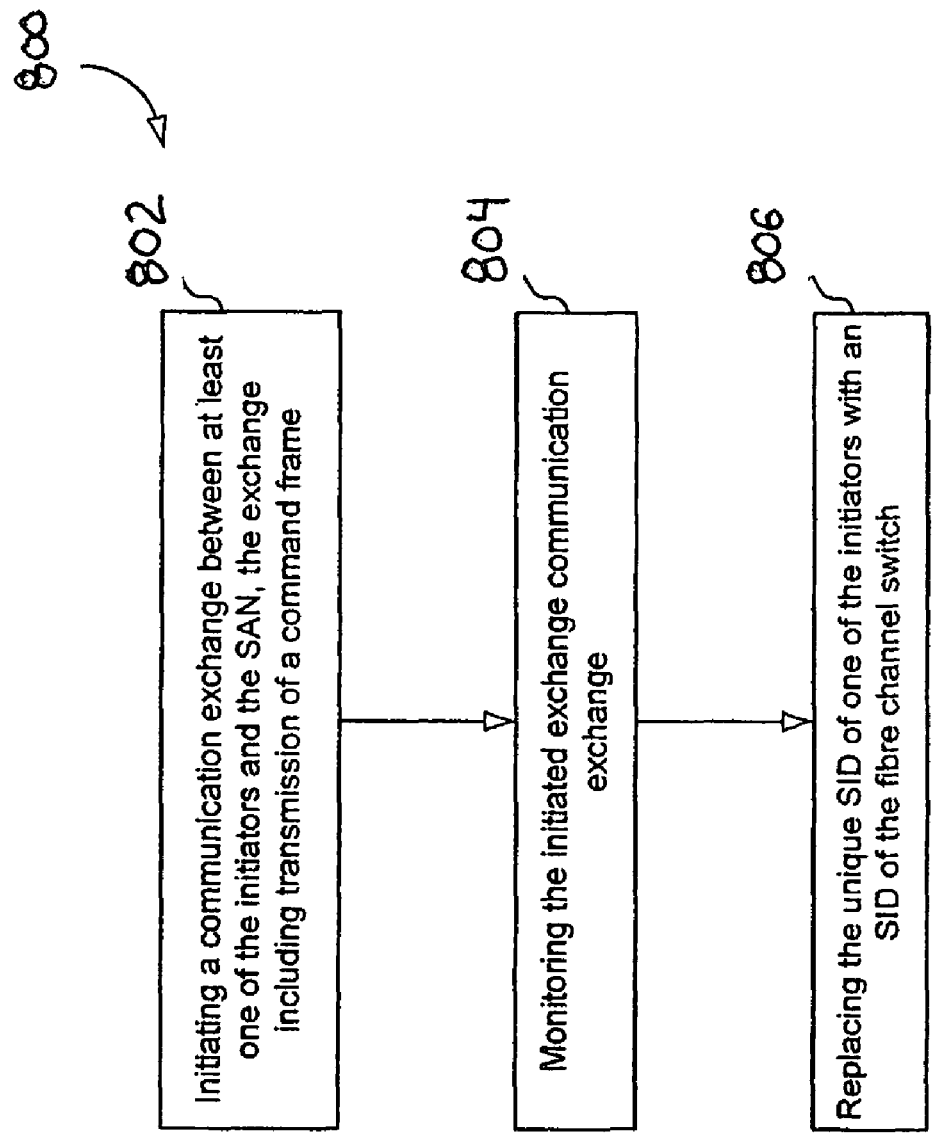
FIG. 8 is a flow diagram that illustrates an exemplary method of practicing a first aspect of an embodiment of the present invention.

FIG. 8 is an illustration of an exemplary method 800 of practicing a first aspect of an embodiment of the present invention. In FIG. 8, a communication exchange is initiated between at least one initiator device and a SAN, the exchange includes transmission of a command frame, as indicated in step 802. In step 804, the exchange is monitored. In step 806, the unique SID of one of the initiators is replaced with an SID of the Fibre channel switch.

Figure 9:
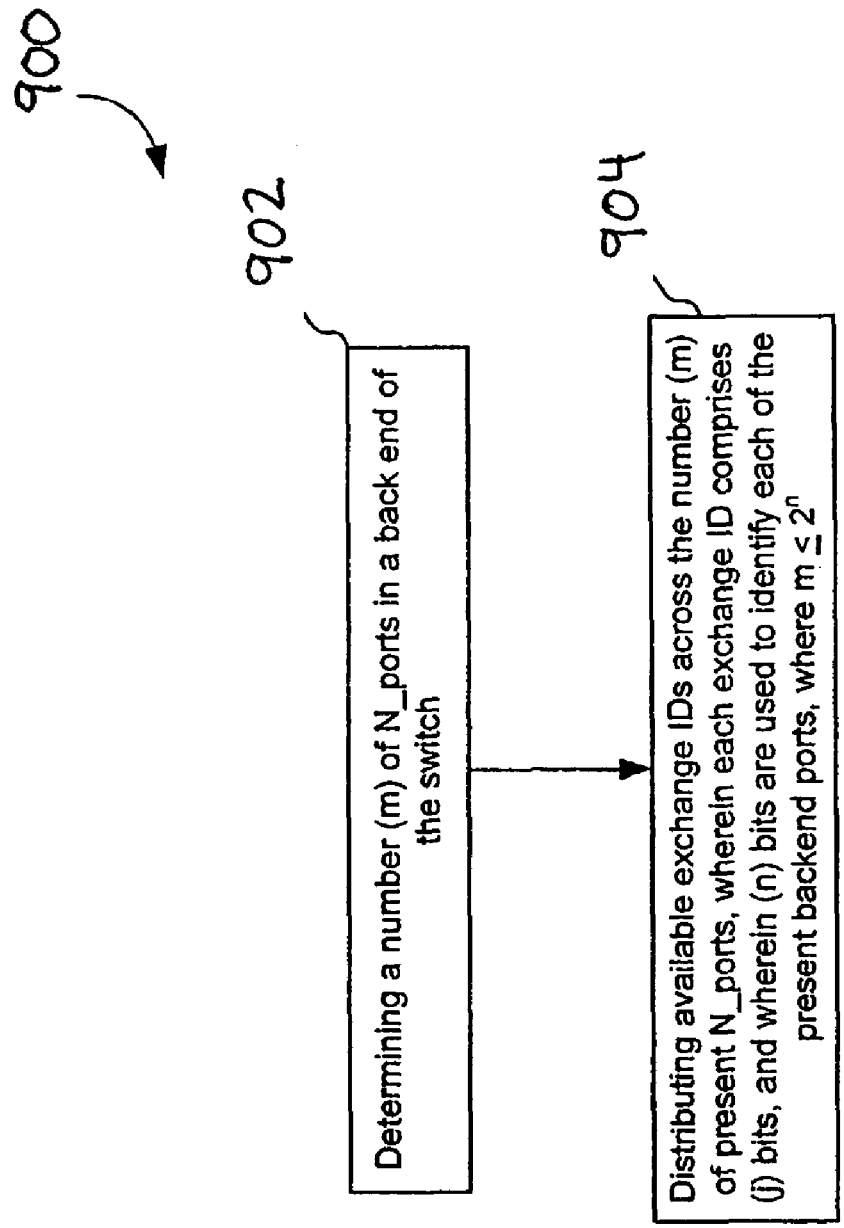
FIG. 9 is a flow diagram that illustrates an exemplary method of practicing a second aspect of an embodiment of the present invention.

FIG. 9 is an illustration of an exemplary method 900 of practicing a second aspect of an embodiment of the present invention. In FIG. 9, a number (m) of N_PORTs present in a back end of the switch is determined, as indicated in step 902. In step 904, the available exchange IDs are distributed across the number (m) of present N_PORTs. Each exchange ID comprises (j) bits, and (n) bits are used to identify each of the present backend ports, where $m \leq 2^n$.

Conclusion

Example embodiments of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. An apparatus for coupling multiple processing devices to a network, the apparatus comprising:
a switch that includes a network port configured for coupling to a network and a plurality of initiator ports each configured for coupling to a processing device,
wherein the switch routes data from the network port to the plurality of initiator ports and from the plurality of initiator ports to the network port; and
a management agent communicatively coupled to the switch and configured to facilitate operation of the switch,
wherein, during operation of the apparatus, the management agent
caches data received from a network target device in response to a first login data generated by a first processing device coupled to a first initiator port of the switch,
captures a second login data generated by a second processing device coupled to a second initiator port of the switch so that the second login data is not forwarded to the network target device, and
responds to the second login data generated by the second processing device using the cached data received from the target device.

2. The apparatus of claim 1, wherein the first login data generated by the first processing device and the second login data generated by the second processing device comprise point-to-point login (PLOGI) process data.

3. The apparatus of claim 2, wherein the management agent sends a command to the target device to clear data exchanges initiated by the second processing device.

4. The apparatus of claim 3, wherein the command comprises an abort sequence (ABTS) frame.

5. The apparatus of claim 3, wherein data exchanges initiated by processing devices coupled to the initiator ports of the switch, other than the second processing device, are not effected by the command.

6. The apparatus of claim 3, wherein the command clears data exchanges initiated by any processing devices coupled to one of the initiator ports of the switch.

7. The apparatus of claim 1, wherein the switch routes Fibre Channel extended link services commands to the management agent for processing.

8. The apparatus of claim 1, wherein the management agent assigns port identification numbers to the plurality of initiator ports of the switch.

9. The apparatus of claim 1, further comprising an exchange manager coupled to the switch.

10. An apparatus for coupling multiple processing devices to a network, the apparatus comprising:
a network port configured for coupling to a network;
a plurality of initiator ports each configured for coupling to a processing device;
processing logic, coupled to the network port and the plurality of initiator ports; and
management agent software, configured to be executed by the processing logic,
wherein, during operation of the apparatus, the management agent software causes the processing logic to
cache data received from a network target device in response to a first login data generated by a first processing device coupled to a first initiator port,
capture a second login data generated by a second processing device coupled to a second initiator port so that the second login data is not forwarded to the network target device, and
respond to the second login data generated by the second processing device using the cached data received from the target device.

11. The apparatus of claim 10, wherein the first login data generated by the first processing device and the second login data generated by the second processing device comprise point-to-point login (PLOGI) process data.

12. The apparatus of claim 11, wherein the management agent sends a command to the target device to clear data exchanges initiated by the second processing device.

13. The apparatus of claim 12, wherein data exchanges initiated by processing devices coupled to the initiator ports, other than the second processing device, are not effected by the command.

14. The apparatus of claim 10, wherein Fibre Channel extended link services commands are routed to the management agent for processing.

15. The apparatus of claim 10, wherein the management agent assigns port identification numbers to the plurality of initiator ports.

16. An apparatus for coupling multiple processing devices to a network, the apparatus comprising:
a network port configured for coupling to a network;
a plurality of initiator ports each configured for coupling to a processing device; and
processing means, coupled to the network port and the plurality of initiator ports,
wherein, during operation of the apparatus, the processing means
caches data received from a network target device in response to a first login data generated by a first processing device coupled to a first initiator port,
captures a second login data generated by a second processing device coupled to a second initiator port so that the second login data is not forwarded to the network target device, and
responds to the second login data generated by the second processing device using the cached data received from the target device.

17. The apparatus of claim 16, wherein the first login data generated by the first processing device and the second login data generated by the second processing device comprise point-to-point login (PLOGI) process data.

18. The apparatus of claim 17, wherein the management agent sends a command to the target device to clear data exchanges initiated by the second processing device.

19. The apparatus of claim 18, wherein data exchanges initiated by processing devices coupled to the initiator ports, other than the second processing device, are not effected by the command.

20. The apparatus of claim 16, wherein Fibre Channel extended link services commands are routed to the management agent for processing.

* * * * *